H. W. BRASHEAR.
MACHINE FOR UNCOILING SPRINGS.
APPLICATION FILED JUNE 15, 1908.

918,121.

Patented Apr. 13, 1909.
2 SHEETS—SHEET 1.

Witnesses
Samuel Payne
R. H. Butler

Inventor
H. W. Brashear
By H. C. Evert
Attorneys

H. W. BRASHEAR.
MACHINE FOR UNCOILING SPRINGS.
APPLICATION FILED JUNE 15, 1908.
918,121.
Patented Apr. 13, 1909.
2 SHEETS—SHEET 2.
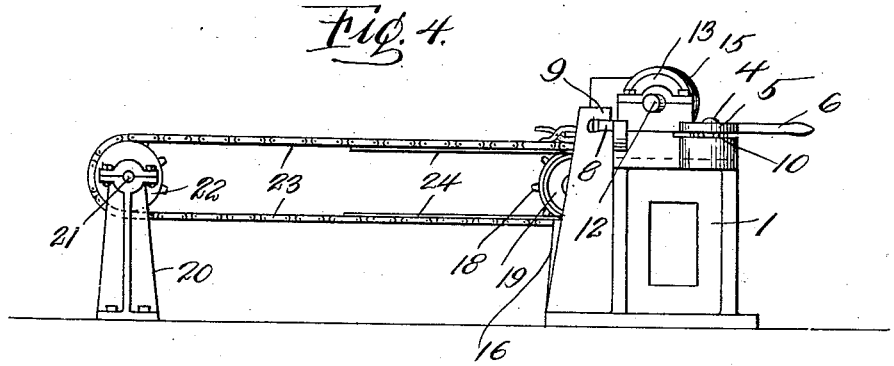
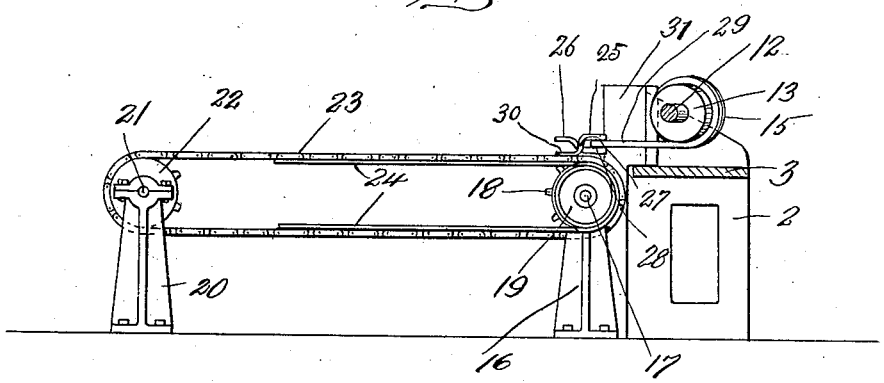
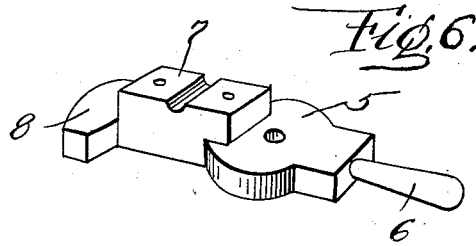
Witnesses
Samuel Payne.
X. H. Butler
Inventor
H. W. Brashear
By H. C. Everts & Co.
Attorneys

UNITED STATES PATENT OFFICE.

HENRY WILLIAM BRASHEAR, OF PITTSBURG, PENNSYLVANIA.

MACHINE FOR UNCOILING SPRINGS.

No. 918,121.      Specification of Letters Patent.      Patented April 13, 1909.

Application filed June 15, 1908. Serial No. 438,552.

*To all whom it may concern:*

Be it known that I, HENRY WILLIAM BRASHEAR, a citizen of the United States of America, residing at Pittsburg, in the county of Allegheny and State of Pennsylvania, have invented certain new and useful Improvements in Machines for Uncoiling Springs, of which the following is a specification, reference being had therein to the accompanying drawing.

This invention relates to a machine for uncoiling springs, and the primary object of my invention is to provide a simple and effective means for supporting a coil spring and feeding the same into position to be uncoiled.

A further object of my invention is to provide a simple, durable and inexpensive machine that will be positive in its action and easy to operate. To this end, I have devised a machine embodying housings having a swiveled and revoluble roll upon which a coil spring is placed to be uncoiled. In connection with the machine an endless chain is employed which is connected to the end of the spring by a novel clamp, whereby when the endless chain is placed in motion, said chain will withdraw the spring from the roll and straighten the same.

The detail construction entering into my invention will be presently described and then specifically pointed out in the appended claims.

Figure 1:
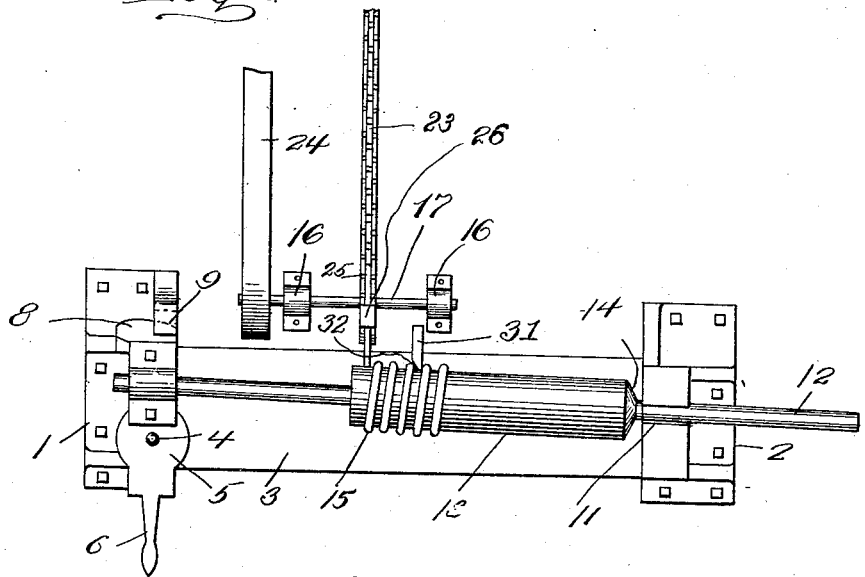
Figure 2:
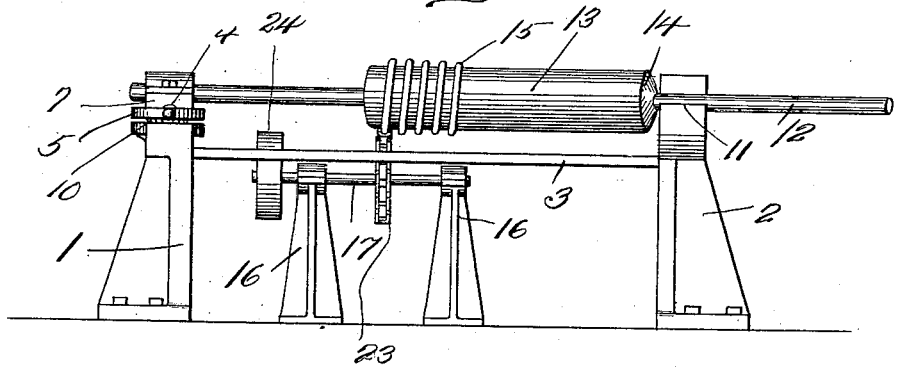
Figure 3:
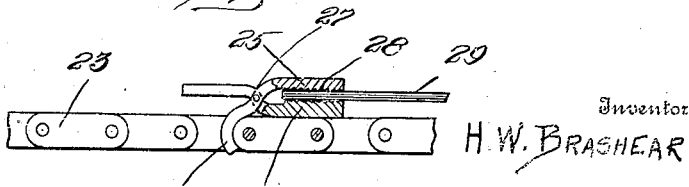

In the drawings:—Figure 1 is a plan of a machine constructed in accordance with my invention, Fig. 2 is a front elevation of the same, Fig. 3 is an enlarged detail view of a portion of an endless chain and clamp carried thereby, Fig. 4 is a side elevation of my machine, Fig. 5 is a longitudinal sectional view of the same, and Fig. 6 is a perspective view of a detached roll supporting member.

In the accompanying drawings, 1 and 2 designate bearings connected by a plate 3. Swiveled upon the bearing 1 by a pin 4 is a roll-supporting member 5 having a handle 6, an auxiliary bearing 7 and a latch 8, said latch being designed to engage under a keeper 9 forming part of the bearing 1. Interposed between the member 5 and the bearing 1 are guide friction balls 10 for reducing the friction between said member and the bearing when moving the same.

The bearing 2 is provided with a longitudinal slot 11 for the neck or spindle 12 of a roll 13, the opposite end of said roll being revolubly mounted in the auxiliary bearing 7. The roll 13 is tapered upon one end, as at 14, whereby a coil spring 15 can be easily slipped upon said roll.

Between the bearings 1 and 2 and at the rear edge of the plate 3 are arranged bearings 16 for a revoluble shaft 17, upon which is mounted a sprocket wheel 18 and a belt wheel or pulley 19. Alining with the bearings 16 are bearings 20 for a revoluble shaft 21 having mounted thereon a sprocket wheel 22. Adapted to travel over the sprocket wheels 22 and 18 is an endless sprocket chain 23, said sprocket chain being driven by virtue of a belt 24 engaging the belt wheel or pulley 19, said belt being driven by a suitable source of power. In lieu of the pulley 19 and belt 24, I desire it to be understood that the armature shaft of the motor can be coupled directly either to the shaft 17 or the shaft 21.

In connection with the sprocket chain 23, I use a clamp comprising two jaws 25 and 26, said jaws being pivotally connected together, as at 27. The confronting forward ends of these jaws are serrated or roughened, as at 28, to engage the end 29 of the coil spring 15, while the opposite end of the arm 25 is bent downwardly to provide a hook 30 for engaging between the links of the sprocket chain 23.

The plate 3 is provided with a guide and feeding device comprising a post 31 having a beveled edge 32.

In operation, a coil spring that has been previously heated is placed upon the roll 13, said roll being swung outwardly from the bearing 2 to permit of the coil spring 15 being placed over the spindle or neck 12 of the roll and moved upon said roll. This is accomplished by manipulating the swiveled member 5. When the roll 13 is returned to its normal position in the bearing 2, the coil spring 15 is positioned upon the roll, whereby the first convolution thereof will be engaged by the guide or feeding device 31. The clamp of the sprocket chain 23 is then placed in engagement with the end of the coil spring 15 and the sprocket chain 23 set in motion. As the clamp travels toward the bearings 20, the coil spring 15 is unwound from the roll 13, said roll being gradually fed toward the swiveled member 5 by virtue of the guide or feeding device engaging the convolutions of the spring. In consequence of this construction the spring 15 is pulled in a direct line, the coil portion of the spring being gradually fed, whereby that portion of the spring being withdrawn will always be in longitudinal alinement with the chain 23. After the spring 15 has been uncoiled from the roll 13, the clamp can be removed from the chain 15 and moved forward to grip the end of another spring placed upon the roll 13.

While in the drawings forming a part of this application there is illustrated the preferred embodiments of my invention, I desire it to be understood that the elements therein are susceptible to structural changes without departing from the spirit of the invention.

Having now described my invention what I claim as new, is:—

1. A machine for uncoiling springs embodying bearings, a plate connecting said bearings, a guide and feeding device carried by said plate, a member swiveled upon one of said bearings, a roll revolubly mounted upon said member and adapted to engage the other of said bearings, a movable sprocket chain arranged adjacent to said plate, and a clamp detachably connected to said chain and adapted to be connected to the end of a spring placed upon said roll.

2. A machine of the type described comprising a member swiveled upon one of said bearings, a roll journaled between said member and the other of said bearings and adapted to support a coil spring, an endless sprocket chain arranged adjacent to said roll, a clamp detachably connected to said chain and adapted to be attached to the end of the coil spring upon said roll, and means adjacent to said roll and engaging the convolutions of the spring mounted thereon for moving said roll as said spring is uncoiled.

3. A machine of the type described comprising bearings, a roll revolubly supported by said bearings and adapted to support a coil spring, means adjacent to said roll for clamping the end of the spring carried thereby for pulling said spring from said roll, means adjacent to said roll for shifting the same during the rotation thereof, and means carried by one of said bearings for moving said roll out of engagement with the other of said bearings.

4. A machine of the type described comprising bearings, a roll revolubly supported thereby and adapted to support a coil spring, means carried by one of said bearings for swinging said roll out of engagement with the other of said bearings, and means adjacent to said roll for engaging between the convolutions of the spring carried thereby for shifting said roll.

5. In a machine for uncoiling springs, a longitudinally shiftable and revolubly-mounted spring-carrying roll, means for causing longitudinal movement of said roll during its revolution, and gripping means traveling laterally of the roll away from the latter to unwind a spring mounted on the roll.

In testimony whereof I affix my signature in the presence of two witnesses.

HENRY WILLIAM BRASHEAR.

Witnesses:
MAX H. SROLOVITZ,
K. H. BUTLER.